United States Patent [19]
Zeile et al.

[11] Patent Number: 5,237,250
[45] Date of Patent: Aug. 17, 1993

[54] MULTIPLEXED STEPPER MOTOR CONTROL APPARATUS

[76] Inventors: Kim A. Zeile, 6914 W. Church, Clarkston, Mich. 48309; James F. Runstrom, 4958 Oakhill Dr., Drayton Plains, Mich. 48329

[21] Appl. No.: 786,881
[22] Filed: Nov. 1, 1991
[51] Int. Cl.$^5$ ............................................. H02P 9/00
[52] U.S. Cl. ..................................... 318/562; 318/34; 318/41; 318/49; 318/67
[58] Field of Search ............... 318/562, 34, 37, 41, 318/49, 50, 67, 85, 563, 568.1–568.24

[56] References Cited
U.S. PATENT DOCUMENTS

| | | | |
|---|---|---|---|
| 3,911,316 | 10/1975 | Feick et al. | 318/562 |
| 4,055,786 | 10/1977 | DiMarzio | 318/562 |
| 4,131,835 | 12/1978 | Lange | 318/562 |
| 4,323,098 | 4/1982 | Suzuki et al. | 144/2 R |
| 4,353,015 | 10/1982 | Krampe et al. | 318/41 |
| 4,371,921 | 2/1983 | Cushman | 364/138 |
| 4,401,931 | 8/1983 | Kulterman et al. | 318/696 |
| 4,613,806 | 9/1986 | Majewski | 318/696 |
| 4,815,013 | 3/1989 | Schmidt | 364/525 |
| 4,859,923 | 8/1989 | Malka et al. | 318/685 |
| 4,874,996 | 10/1989 | Rosenthal | 318/567 |
| 4,999,550 | 3/1991 | Jones | 318/50 |

Primary Examiner—William M. Shoop, Jr.
Assistant Examiner—Brian Sircus
Attorney, Agent, or Firm—Basile and Hanlon

[57] ABSTRACT

A multiplexor circuit connects a plurality of stepper motors to a lesser number of stepper motor drivers with at least one driver connected to a plurality of parallel connected stepper motors. A control computer through a multi-axis position controller generates step commands to the drivers to move one or more stepper motors a predetermined amount, at a predetermined speed and in a predetermined direction of rotation. The computer configures switches in the multiplexor circuit to connect selected ones of the stepper motors to selected drivers such that a plurality of stepper motors may be connected in parallel to a single driver such that a single driver can sequentially drive multiple stepper motors thereby reducing the number of drivers required for a plurality of stepper motors.

18 Claims, 7 Drawing Sheets

MULTIPLEXED STEPPER MOTOR CONTROL APPARATUS

BACKGROUND OF THE INVENTION

Field of the Invention

The present invention relates, in general, to stepper motors and, more specifically, to stepper motor control apparatus.

Description of the Art

Stepper motors are widely employed to move an object a selected distance at a selected speed. Such stepper motors enable a machine or other apparatus to be reconfigured or to execute various steps in a predetermined order or operation.

However, conventional stepper motor control apparatus employ a single stepper motor driver for each stepper motor. This results in an expensive control apparatus due to the high cost of the stepper motor drivers as well as the increased space requirement to mount such drivers in a control panel.

It would be desirable to provide a stepper motor control apparatus which overcomes these problems. It would also be desirable to provide a stepper motor control apparatus which is less costly than conventional stepper motor control apparatus. It would also be desirable to provide a stepper motor control apparatus which enables a plurality of stepper motors to be selectively connected to a single stepper motor driver. Finally, it would be desirable to provide a stepper motor control apparatus which enables a plurality of stepper motors to be selectively connected, either singly or in selectible groups, to one or more stepper motor drivers.

SUMMARY OF THE INVENTION

The present invention is a multiplexed stepper motor control apparatus which controls a plurality of stepper motors.

The apparatus includes a plurality of selectively energizable stepper motor drivers which supply electrical energy in the form of a pulse width modulated series of pulses to one or more stepper motors to determine the amount of movement, the direction of movement and the speed of movement of the stepper motor output. A stepper motor controller in the form of a multi-axis position controller receives commands from a computer executing a control program to selectively energize certain stepper motor drivers.

The apparatus of the present invention includes multiplexor means for selectively connecting certain stepper motors to certain stepper motor drivers, with one stepper motor driver being capable of being connected to a plurality of stepper motors. The multiplexor means comprises a switching circuit formed of relay contact sets selectively controlled by commands from a control computer. The relay contact sets are connected between certain drivers and certain stepper motors such that when energized by the control computer, one or more stepper motors may be operably energized by a single driver. This significantly reduces the cost of stepper motor control apparatus as compared to conventional stepper motor control apparatus since a single driver may be uniquely connected to a plurality of stepper motors instead of the conventional one driver to one stepper motor arrangement.

In another embodiment, a plurality of relays are provided in a number sufficient to enable each stepper motor to be selectively connected under program control of the control computer to any of the drivers. This adds greater flexibility to the stepper motor control apparatus since the operation of the apparatus may be varied under user control to create different modes of operation including simultaneous energization of certain stepper motors in selectible groups.

The stepper motor control apparatus of the present invention also includes means for storing the actual position of each of the stepper motors. This data may be recalled to move the stepper motors to the previously stored position to replicate a certain configuration for the apparatus controlled by the stepper motors.

The stepper motor control apparatus of the present invention significantly reduces the costs associated with such stepper motor control apparatus since the number of expensive drivers is reduced by uniquely connecting a single driver to a plurality of stepper motors. A less expensive multiplexor circuit including relays, for example, is employed to effect selective connection of parallel arranged stepper motors to a single driver.

BRIEF DESCRIPTION OF THE DRAWING

The various features, advantages and other uses of the present invention will become more apparent by referring to the following detailed description and drawing in which.

DESCRIPTION OF THE PREFERRED EMBODIMENTS

Referring now to the drawings, there is depicted a multiplexed stepper motor control apparatus which controls a plurality of stepper motors with a lesser number of individual stepper motor drives.

Figure 1:
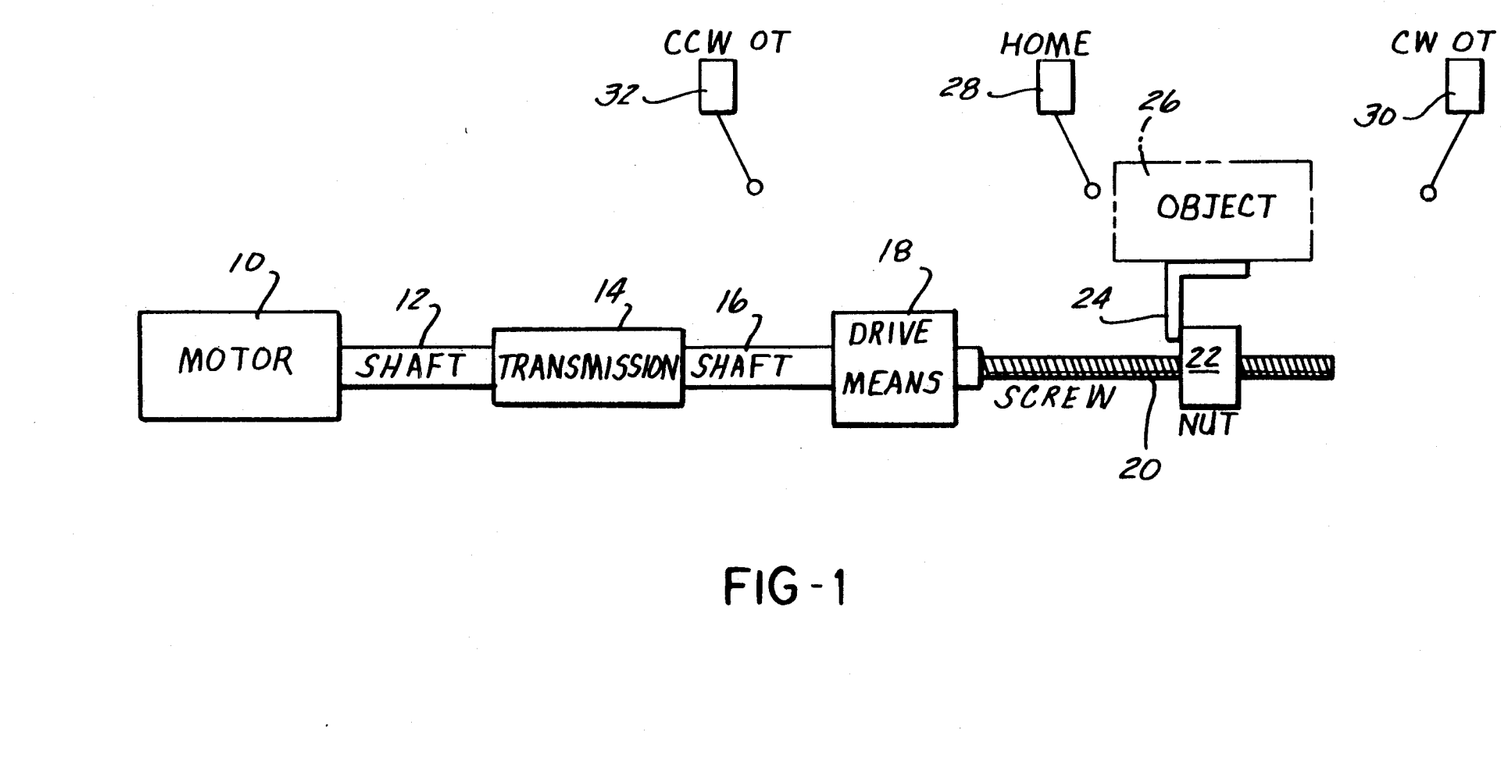
FIG. 1 is a pictorial representation of a stepper motor employed to move an object along a predetermined path.

For clarity in understanding the features and advantages of the present invention, a brief description of a typical environment in which the present apparatus could be advantageously employed is depicted in FIG. 1.

In FIG. 1, a conventional stepper motor 10 is illustrated. The stepper motor 10 has a bi-directional rotatable output shaft 12 extending therefrom. A gear or transmission means 14 may be coupled to the output shaft 12 for providing gear reduction for increased torque or for changing the axis of motion of the output shaft 12. A shaft 16 extends from the gear means 14 to a drive means 18, such as an electric cylinder. As is well known, such cylinders have a bi-directional rotatable output screw. A nut or seat 22 is mounted on the screw and travels linearly in either direction along the screw as the screw 20 is rotated clockwise or counterclockwise. A suitable mounting means, such as a bracket 24, is connected to the seat 22 and supports an object 26 to be reciprocatingly moved.

In order to define the positions of the object 26, suitable position sensors are provided. Such position sensors include a HOME limit switch 28 which detects the normal or design position of the object 26. In addition, a CW TO limit switch 30 is mounted at the maximum travel distance of the object 26 when the screw 20 is rotated in a clockwise direction. Another switch 32 labelled CCW OT is provided at a maximum travel distance of the object 26 when the screw 20 is rotated in a counterclockwise direction.

Figure 2:
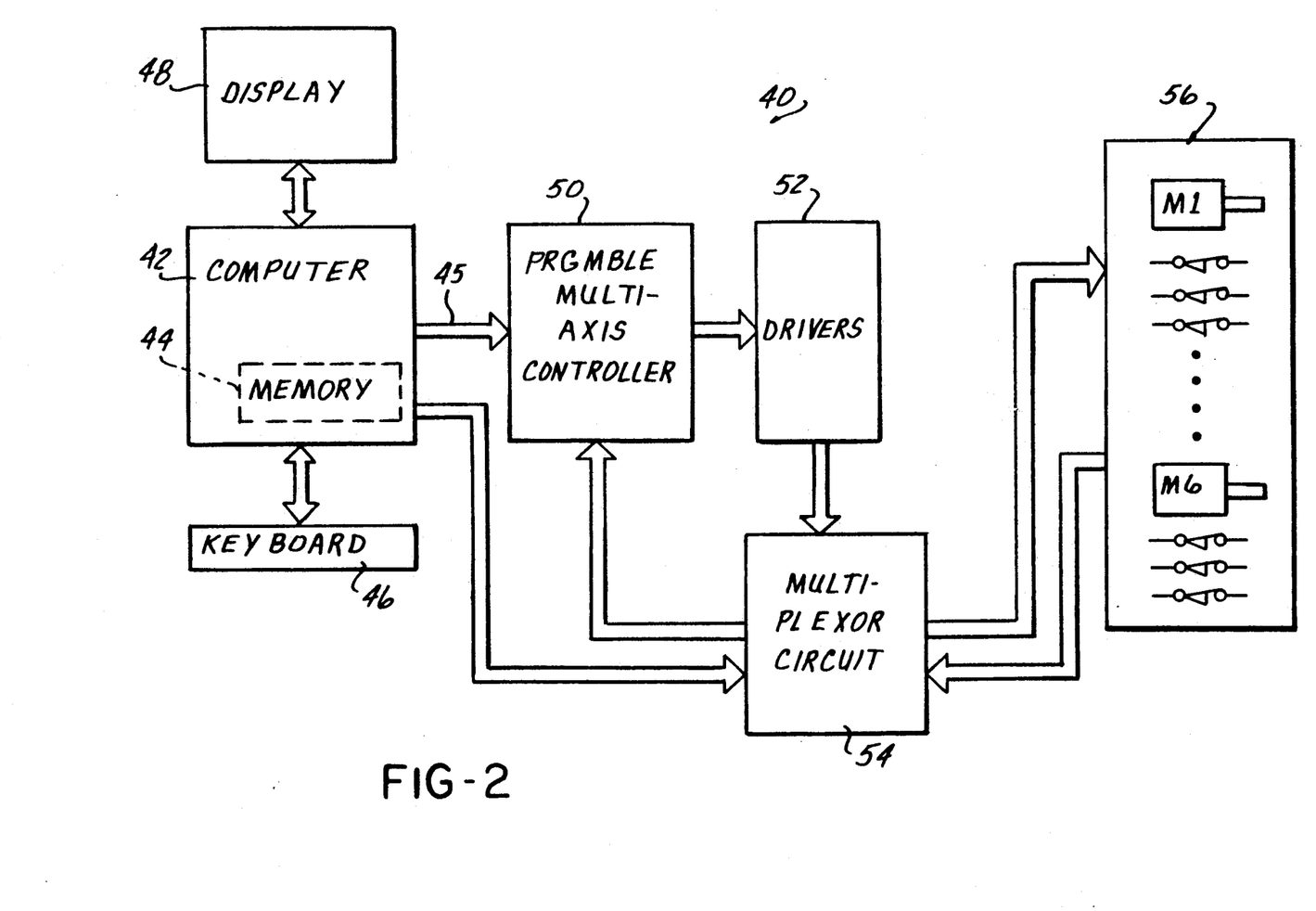
FIG. 2 is a block diagram of the multiplexed stepper motor control apparatus of the present invention.

Referring now to FIG. 2, there is depicted a block diagram of the multiplexed stepper motor control apparatus 40 of the present invention. The apparatus 40 includes a computer 42 which may be any conventional computer, such as an IBM compatible computer or a VME compatible computer. The computer 42 includes internal and/or external memory 44 for storing control programs and data. A keyboard 46 provides user inputs to the computer 42 and a conventional display or monitor provides menu selection for a user.

The computer 42 is connected to a programmable multi-axis controller 50 which provides multiple axis stepper motor control. Any conventional multi-axis controller 50 may be employed in the present invention. By way of example only, a programmable multi-axis controller sold by Delta Tau Data Systems, Inc., of Canoga Park, Calif., Model No. PMAC-VME(DSP) is employed to provide control of up to eight axes. Upon commands from the computer 42, the programmable multi-axis controller 50 will generate a pulse train containing of a predetermined number of pulses at a pulse width modulated frequency to drivers 52 for the stepper motors 56. The drivers 52, as described hereafter, convert the pulses from the programmable multi-axis controller 50 to electrical current of a prescribed polarity, duration and frequency for application to the individual stepper motors 56.

According to the present invention, a unique multiplexor or switching circuit 54 is provided to selectively connect one or more or any one of the stepper motors denoted in general by reference number 56 in FIG. 2 to one of the drivers 52. The multiplexor circuit 54 also selects the individual HOME, CW OT and CCW OT signals associated with the previously selected stepper motor for transmission to the computer 42.

Figure 3:
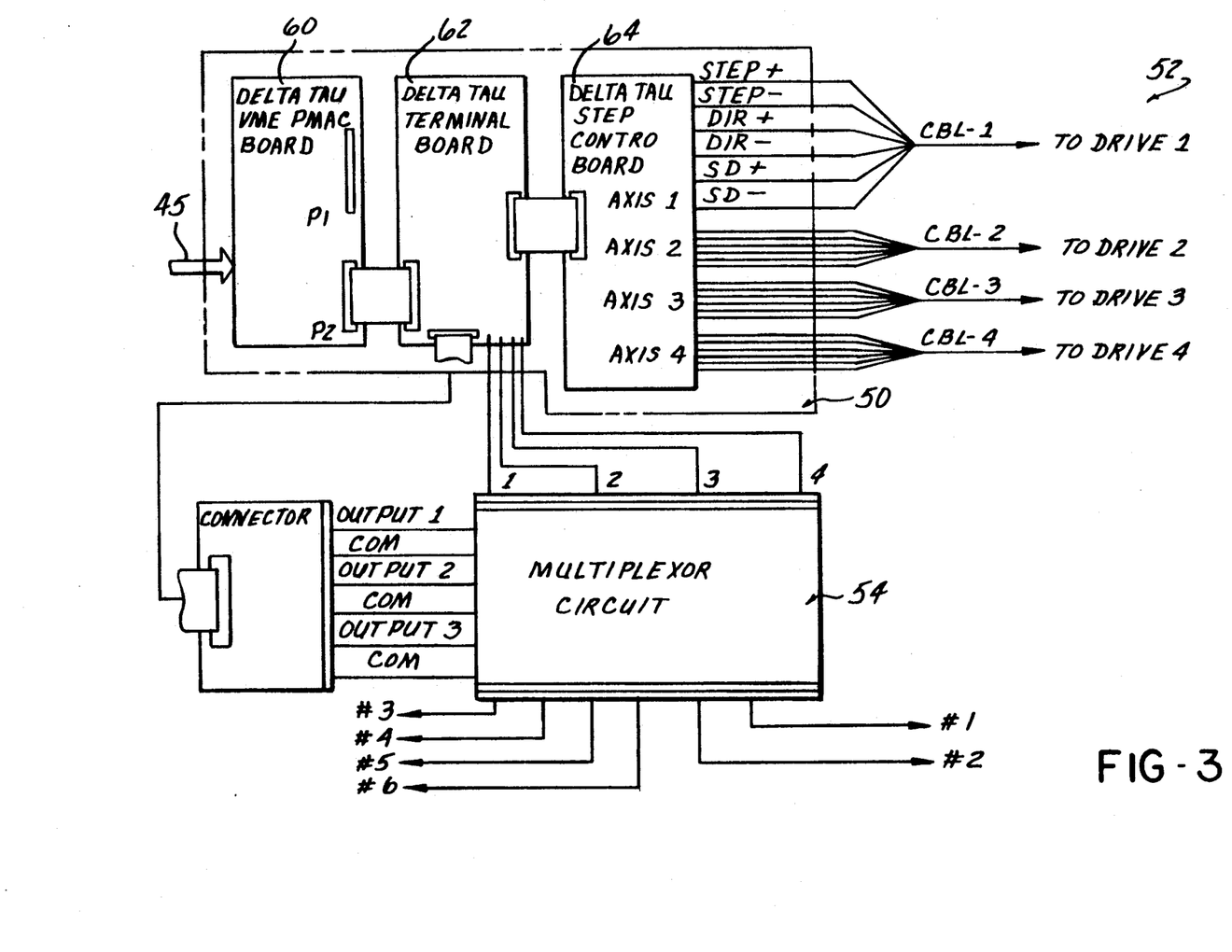
FIG. 3 is a block diagram of a portion of the apparatus shown in FIG. 2.

As shown in greater detail in FIG. 3, the programmable multi-axis controller 50, in the example described above, includes three separate circuit boards, namely, a VME PMAC board 60, a terminal board 62 and a stepper controller board 64, all forming a part of the controller sold by Delta Tau Data Systems, Inc. The circuitry on the circuit boards 60, 62 and 64 are connected via cables to provide the desired output signals to the individual drivers 52 and to the multiplexor circuit 54. Upon receiving a user input specifying a predetermined amount of travel advance of one of the driven members, such as the object 26 shown in FIG. 1, the computer 42 will convert the input distance to a number of pulse steps or counts. This information is provided to the programmable multi-axis controller 50 which converts the pulse count to a series of pulses at a pulse width modulated frequency which determines the speed of rotation of the output shaft of the stepper motor driven by the selected stepper motor.

The stepper controller board 64 of the controller 50 generates a set of signals for each driver labelled "STEP+, STEP−, DIRECTION+, DIRECTION−, SHUTDOWN+ and SHUTDOWN−. These signals are output on separate cables to each driver 52.

Figure 4:
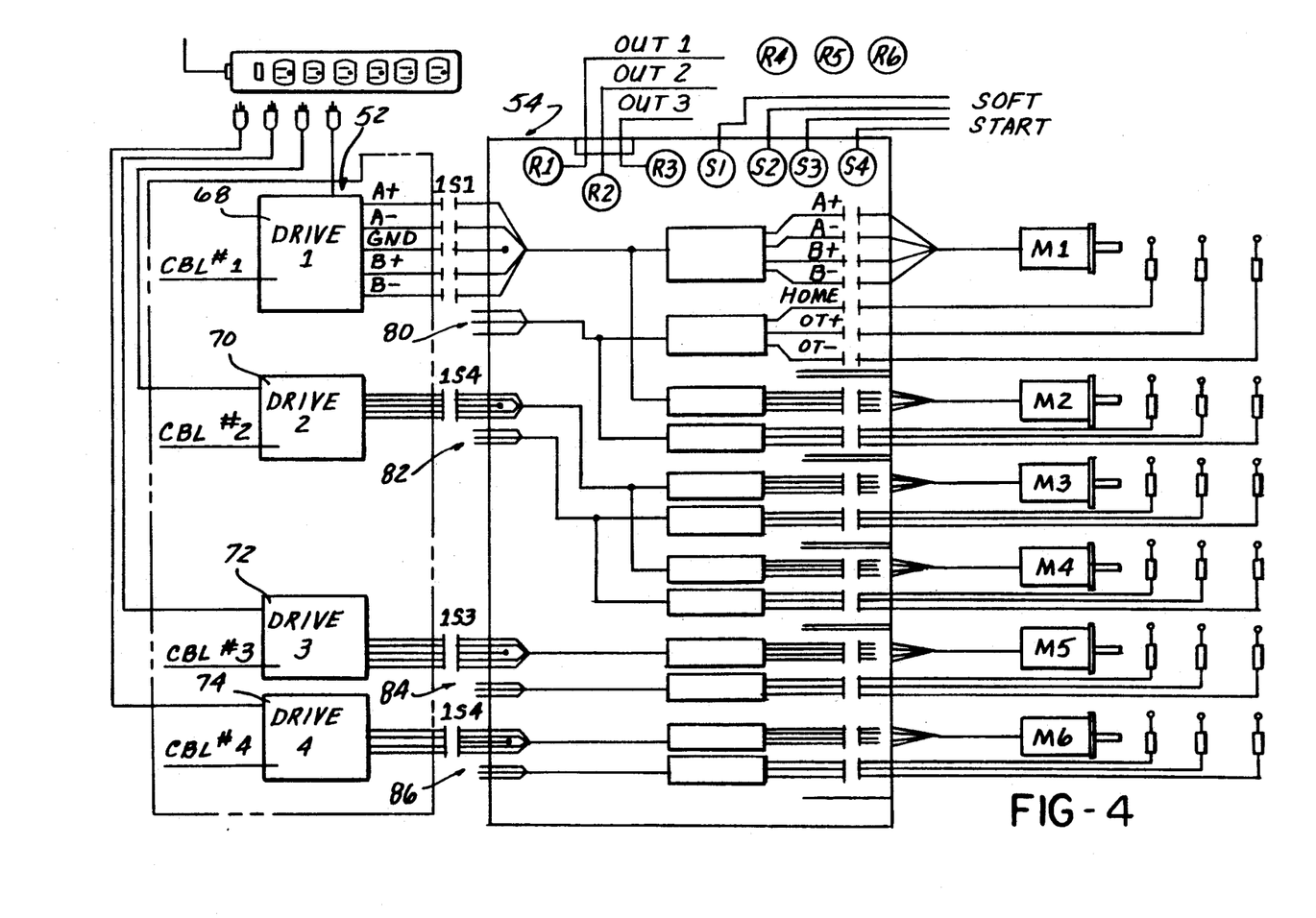
FIG. 4 is a block diagram showing another portion of the apparatus depicted in FIG. 2.

As shown in FIG. 4, each driver is connected to a suitable source of 120 VAC electric power and receives one of the cables from the multi-axis controller 50. Any suitable stepper motor driver may be employed in the present invention. By way of example only, a stepper motor driver suitable for electric cylinder control and manufactured by Industrial Controls Corporation, Navato, Calif., Model No. S5101, is employed in the present invention. This driver is capable of driving four, six or eight lead motors.

In the present invention, four drivers 68, 70, 72 and 74 are employed. Each of the drivers 68, 70, 72 and 74 receives a separate cable from the multi-axis controller 50 containing the appropriate control signals described above. Each driver then outputs electric current on conductors labelled "A+, A−, B+, B− and GND to the multiplexor circuit 54. Each driver 68, 70, 72 and 74 is energized by the controller 50 either independently or simultaneously in combination with other drivers.

Figure 5:
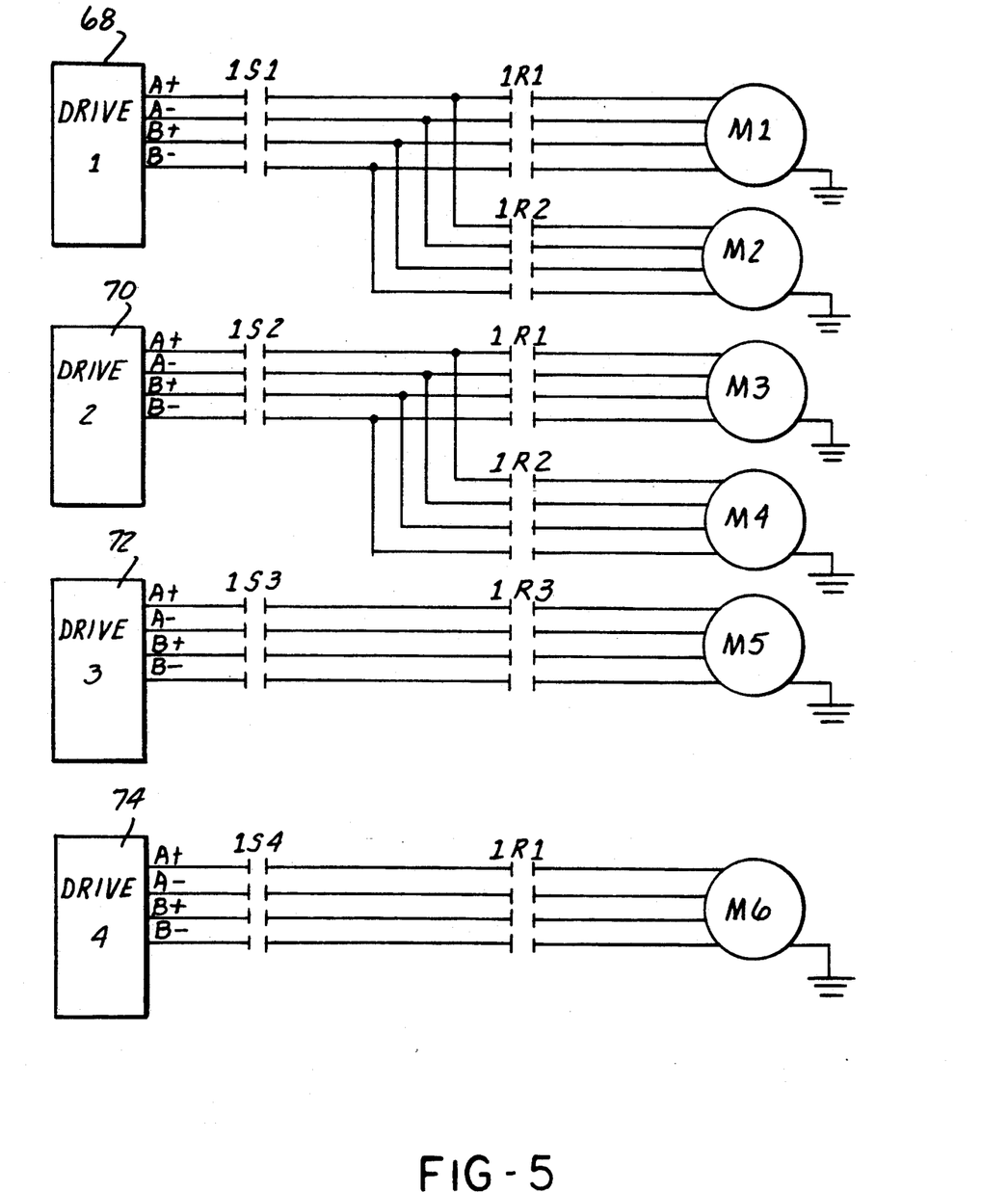
FIG. 5 is a schematic diagram showing a portion of the multiplexor circuit of the present invention.

The multiplexor circuit 54 contains a plurality of switch devices, such as relays. A first set of soft start relays labelled S1, S2, S3 and S4 are selectively energized by control signals from the computer 42. As shown in FIGS. 4 and 5, the contacts 1S1, 1S2, 1S3 and 1S4 associated with each of the soft start relays S1, S2, S3 and S4, respectively, are connected between the individual output signal lines of each driver 68, 70, 72 and 74 to the remaining circuitry for the stepper motors M1–M6. The purpose of the soft start relays S1, S2, S3 and S4 is to provide isolation from voltage surges or spikes which could damage the other contacts in the multiplexor circuit 54, described hereafter, or the stepper motors.

Also contained in the multiplexor circuit 54 are three select relays labelled R1, R2 and R3. The select relays R1, R2 and R3 provide selection, under computer 42 control, of the energization of a selected one of the stepper motors M1–M6. The use of such select relays R1, R2 and R3, which may be provided in any number, enables a plurality of stepper motors to be connected in parallel to a single driver, such as the stepper motors M1 and M2 which are connected in parallel to the first driver 68, so as to reduce the number of drivers required for the number of stepper motors in a particular control system.

The multiplexor circuit shown in FIG. 5 is provided by way of example. It will be understood that other arrangements may be provided to connect any number of stepper motors to a particular driver and to energize such stepper motors individually, one at a time.

Thus, as shown in FIG. 5, when the relay R1 is energized by a command from the computer 42, its contacts labelled 1R1 will close thereby connecting the stepper motors connected thereto, such as stepper motors M1, M3 and M6 in FIG. 5 to the respective driver, such as drivers 68, 70 and 74, for simultaneous energization of the stepper motors M1, M3 and M6. Likewise, the contacts 1R2 of the select relay R2 are connected in parallel with the contacts 1R1, but are individually connected to stepper motors M2 and M4. In this manner, when the select relay R1 is de-energized and the select relay R2 energized, stepper motors M2 and M4 are energized by the first and second drivers 68 and 70; while stepper motors M1 and M3 remain de-energized. The contacts 1R3 of the third select relay R3 are connected between the soft start contacts 1S1, the third driver 72 and stepper motor M5.

Alternate configurations in which six select relays may be provided for six stepper motors, with the individual contacts of each select relay being connected in parallel with the contacts of the other select relays to a single driver. In this manner, a single driver controls any number of individual stepper motors thereby eliminating the cost of separate drivers for each stepper motor.

Figure 6:
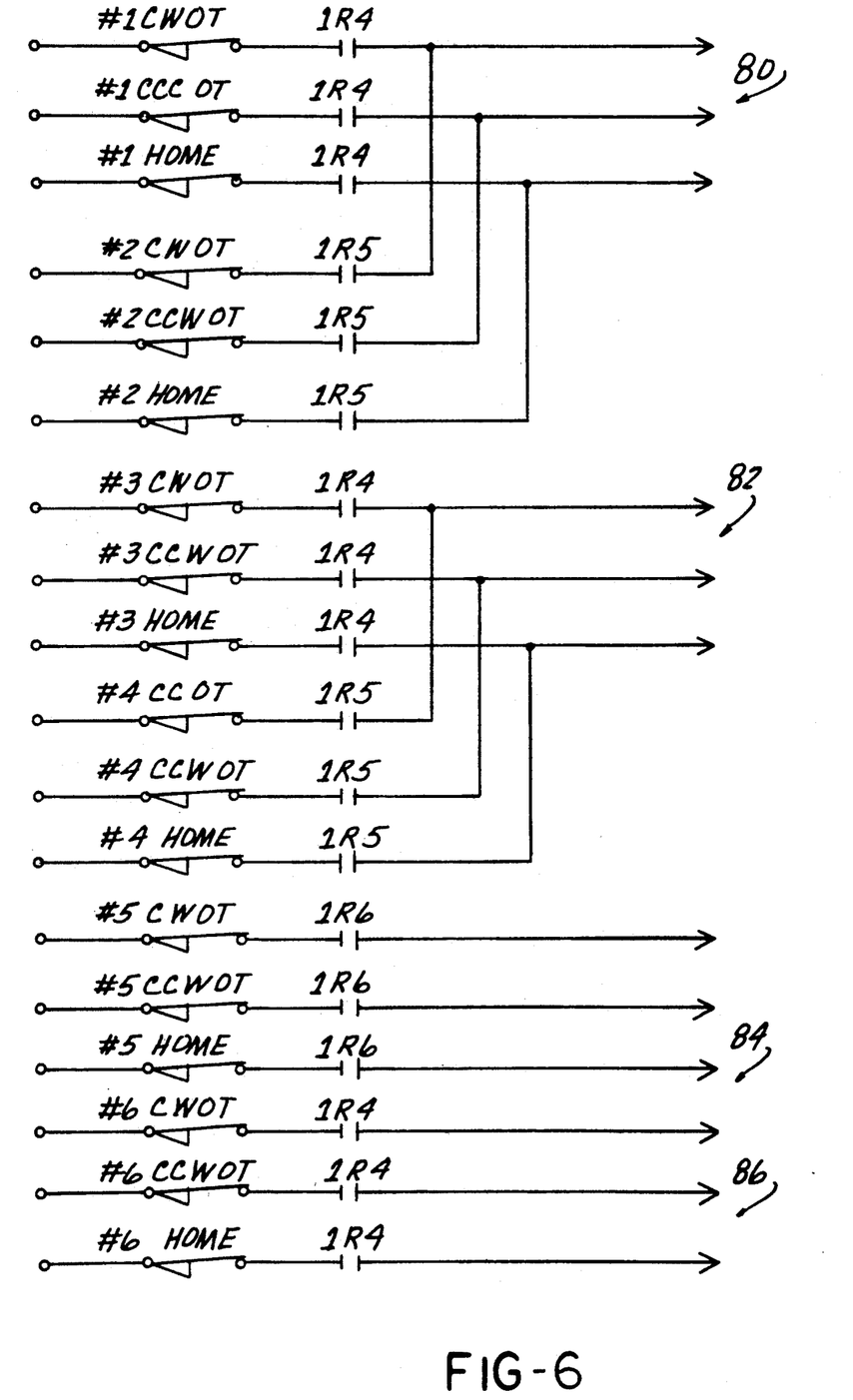
FIG. 6 is a schematic diagram showing another portion of the multiplexor circuit of the present invention.

FIG. 6 depicts the connection of the home and over-travel limit switches of each of the stepper motors M1-M6 as to the computer 42. Contacts from additional relays R4, R5 and R6 are provided for each set of HOME and over-travel limit switches associated with each stepper motor M1-M6. Thus, contacts 1R4 of the select relay R4 are connected in series with the CW OT, CCW OT and HOME limit switches associated with the first stepper motor M1. A set of 1R5 contacts from select relay R5 are likewise associated with the CW OT, CCW OT and HOME limit switches of the second stepper motor M2. These serial pairs are connected in parallel to common output conductors denoted generally by reference number 80. These signals are input to the computer 42 to enable the computer 42, when executing its control program, as described hereafter, to establish the travel limits and the HOME position of the object driven by each stepper motor.

As also shown in FIG. 6, additional sets of 1R4 and 1R5 contacts are connected in series with the over-travel and home limit switches associated with the third and fourth stepper motors M3 and M4, respectively. These signals are connected in parallel to a common group of output conductors 82 which are input to the computer 42. Similar over-travel and HOME signals are also provided on conductors 84 and 86 for stepper motors M5 and M6.

The control program stored in the memory 44 of the computer 42 is designed to control the amount, direction and speed of rotation of the output shaft 12 of each stepper motor under program control of a user. In initiating each movement of a stepper motor output shaft, the control program executed by the computer 42 follows a predetermined sequence to prevent surges or voltage spikes from damaging the multiplexor circuitry 54. Specifically, the computer 42, before energizing a stepper motor, will activate the shut-down input of the multi-axis controller 50 to turn off power to the driver associated with a particular axis of the controller 50. The computer 42 then de-energizes the appropriate soft start relay S1, S2, S3 or S4, as described above, thereby opening the respective contacts of the soft start relay. This isolates the driver connected to the soft start relay contacts from the multiplexor circuitry 54 and connected stepper motor. Next, the computer 42 generates appropriate signals energizing one or more of the select relays R1, R2 and R3 and then energizes the soft start relay S1-S4 associated therewith. The shut-down signal is then turned off to enable current to be supplied to the stepper motor from the associated driver.

In operation, the computer 42 executes its control program and generates a succession of menus on the display 48 providing the user with various options in moving the device or object attached to each stepper motor in a preferred amount or direction. The first menu is an Options Menu and contains various selections as follows:

| | |
|---|---|
| F1 | MOTOR PARAMETER MENU |
| F2 | JOG MOTOR MENU |
| F3 | HOME AXIS MENU |
| F4 | AUTO HOME AXIS MENU |
| F5 | AXIS POSITION MENU |
| F6 | COMMENT ENTRY MENU |
| F7 | LIST SYSTEM FILES MENU |
| F8 | FILE NAME ENTRY MENU |
| F10 | EXIT TO DOS |

This provides the user with access to other menus for various control functions.

When the operator selects F1, the computer 42 will generate a Motor Parameter Menu which contains preprogrammed speed of the movement as well as the maximum and minimum positions corresponding to maximum and minimum over-travel positions for each of the stepper motors M1-M6. An example of such a Motor Parameter Menu is set forth below:

| AXIS # | SPEED | MIN. POSN(mm) | MAX. POSN(mm) |
|---|---|---|---|
| 1 | 10 | −54.3 | 73.4 |
| 2 | 10 | −58.2 | 51.9 |
| 3 | 10 | −40.5 | 90.3 |
| 4 | 10 | −25.0 | 64.7 |
| 5 | 10 | −19.1 | 48.4 |
| 6 | 10 | −53.7 | 64.1 |

It is noted that the minimum and maximum positions and the speed set forth in the Motor Parameter Menu have been preprogrammed or may be altered by the user. These values may be changed by the user by entering new data via the keyboard 46. The positions are set forth in millimeters and define an actual position on the object or apparatus being moved by the stepper motors. Speed is depicted as a relative value on a scale of 0 to 12 for example, with 12 representing the fastest speed possible.

When the operator selects option F2, the control program generates an Axis Jog Menu as set forth below:

| AXIS # | MIN. POSN(mm) | CURRENT POSN(mm) | MAX. POSN(mm) |
|---|---|---|---|
| 1 | −54.3 | 0.0 | 73.4 |
| 2 | −58.2 | 0.0 | 51.9 |
| 3 | −40.5 | 0.0 | 90.3 |
| 4 | −25.0 | 0.0 | 64.7 |
| 5 | −19.1 | 0.0 | 48.4 |
| 6 | −53.7 | 0.0 | 64.1 |

The Axis Jog Menu repeats the pre-stored minimum and maximum positions for each axis as well as the current position in millimeters of the object on each axis. The user may select one of the axes for movement and, via the incrementing and decrementing keys on the keyboard 46, generate commands to the computer 42 to jog the stepper motor associated with the selected axis in a clockwise or counterclockwise direction in response to repeated incrementing or decrementing key inputs. In this manner, the user move a particular stepper motor to a desired position.

Another menu selection labelled F3 enables the user to move the object associated with a selected stepper motor to its HOME position. The Axis Home Menu appears as:

| AXIS # | MIN. POSN(mm) | CURRENT POSN(mm) | MAX. POSN(mm) |
|---|---|---|---|
| 1 | −54.3 | 0.0 | 73.4 |
| 2 | −58.2 | 0.0 | 51.9 |
| 3 | −40.5 | 0.0 | 90.3 |
| 4 | −25.0 | 0.0 | 64.7 |
| 5 | −19.1 | 0.0 | 48.4 |
| 6 | −53.7 | 0.0 | 64.1 |

This menu also repeats the minimum and maximum positions for each of the axes as well as the current position of the object on each axis. When a particular axis is selected by the user via the keyboard 46, the computer 42 will generate appropriate commands to the controller 50, drivers 52 and selected stepper motors M1–M6 which result in an automatic movement of the selected stepper motor to its HOME position. During such homing movement, the selected stepper motor is driven in a counterclockwise direction until the CCW OT limit switch associated therewith is struck. The selected stepper motor is then reversed and driven in a clockwise direction until the HOME limit switch is made. This represents the 0.0 current position shown in the Axis Home Menu. This menu provides selective homing of each axis independent of the other. If option F4 is selected, the same menu screen as set forth above for the Axis Home Menu will be displayed. When automatic homing is selected by the user via an input from the keyboard 46, the computer 42 will automatically home each axis in succession.

When option F5 is selected, a menu labelled Axis Position will be displayed. This menu contains desired, actual and initial position data for each axis as set forth below:

| AXIS # | DESIRED POSN(mm) | ACTUAL POSN(mm) | INITIAL POSN(mm) |
|---|---|---|---|
| 1 | 0.0 | 0.0 | 0.0 |
| 2 | 0.0 | 0.0 | 0.0 |
| 3 | 0.0 | 0.0 | 0.0 |
| 4 | 0.0 | 0.0 | 0.0 |
| 5 | 0.0 | 0.0 | 0.0 |
| 6 | 0.0 | 0.0 | 0.0 |

(Although 0's are displayed in the menu for each desired, actual and initial position, the actual position of each object associated with each stepper motor M1–M6 will be displayed in this menu on the display or monitor 48.

The F5 option enables the user to store the actual positions for each axis under a particular file name for recall at a later time. This information can be recalled from memory whenever the F5 option is selected. When the appropriate file has been recalled, an Axis Position Menu, as set forth above will be generated by the computer 48. This menu sets forth the actual position of each axis as well as the initial position of each axis previously stored in the memory 44. The user via appropriate keys on the keyboard 46 may then input a desired position for one or more axes and, when an enter command is generated, the computer 42 will generate appropriate commands to move the selected stepper motor(s) the desired amount. This new position can then be saved as an initial position for future recall.

The last two menus F6 and F7 provide data for comments associated with a particular stored file as well as a listing of all of the stored file names.

It should be noted that the connections between the soft start contacts 1S1–1S4 and the individual select relay contacts for each of the stepper motors M1–M6 are hard-wired in the embodiment shown in FIG. 5. This dedicates each select relay and associated stepper motor to a particular driver.

Figure 7:
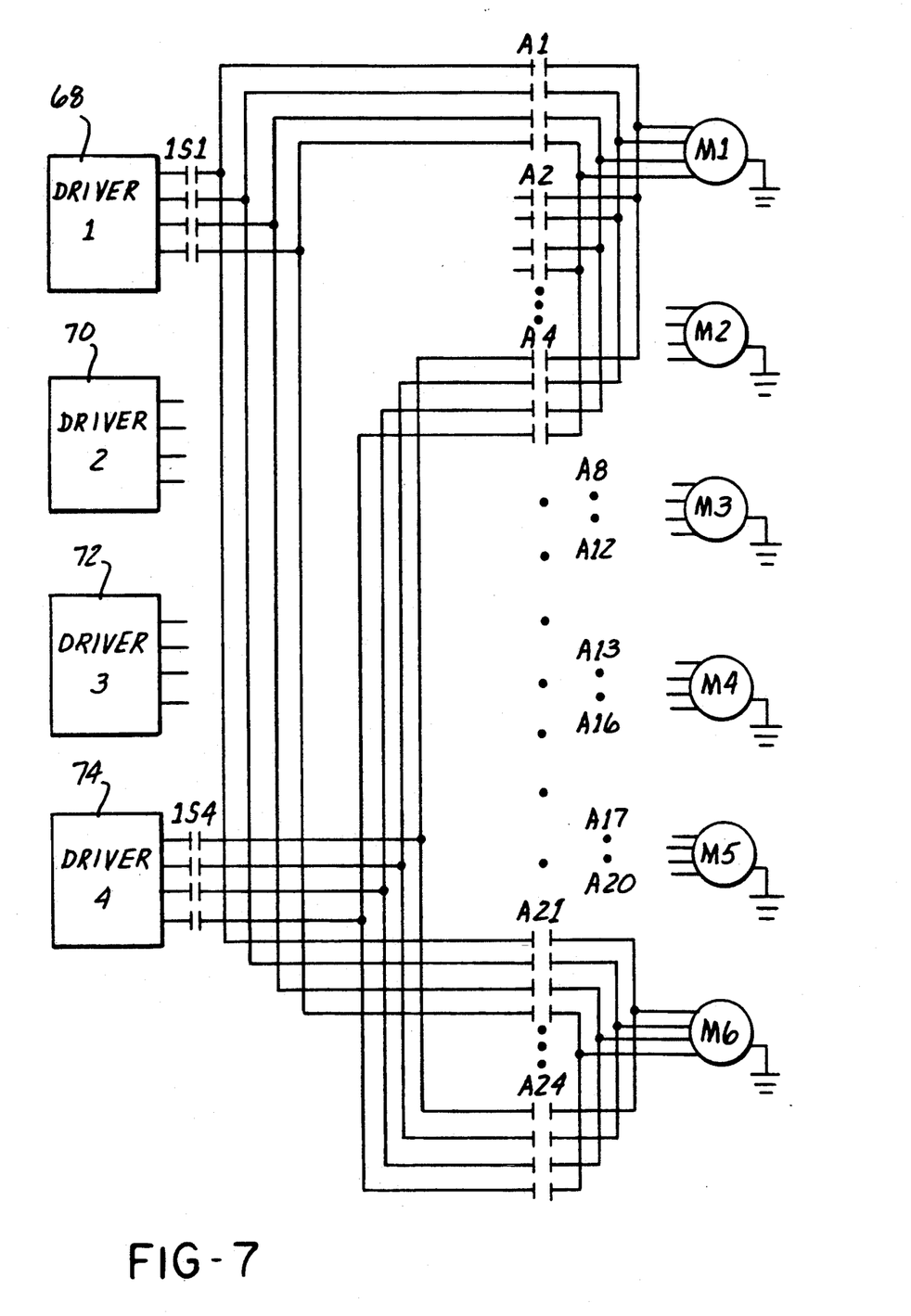
FIG. 7 is a schematic diagram showing another embodiment of the multiplexor circuit of the present invention.

Greater flexibility can be obtained by bussing the connections between the outputs of the drivers 68, 70, 72 and 74 and the individual stepper motors M1–M6 as shown in FIG. 7. In the embodiment shown in FIG. 7, twenty-four relays, each having a set of four contacts and respectively labelled A1–A24, are provided. Each set of contacts A1–A24 is individually connected between the soft start contacts of each driver 68, 70, 72 and 74 and each stepper motor M1–M6. These connections may be hard-wired connections or, preferably, bus connections on a circuit board on which the relays containing the contact sets A1–A24 are mounted.

This arrangement provides selective control of the connections between each of the drivers 68, 70, 72 and 74 and each of the stepper motors M1–M6. The relays A1–A24 may be individually energized or energized in groups of two or more simultaneously to effect different operations of the apparatus controlled by the stepper motor control apparatus 10 of the present invention. As one set of contacts A1–A24 is connected between the first driver 68 and each of the motors M1–M6, successive energization of relays A1, A5, A9 and A13 will enable the first driver 68 to sequentially drive all six stepper motors M1–M6. Different stepper motors may be energized by merely energizing different relays A1–A24.

In summary, there has been disclosed a unique multiplexed stepper motor control apparatus which significantly reduces the number of stepper motor drivers required to control a plurality of stepper motors. The present apparatus enables a single driver to individually control a plurality of stepper motors thereby effecting a significant cost savings over conventional stepper motor control apparatus.

What is claimed is:

1. A multiplexed stepper motor control apparatus comprising:
   a plurality of stepper motors;
   a plurality of selectively energizable stepper motor drivers, the drivers supplying electrical energy to certain stepper motors;
   a single stepper motor controller supplying control signals to the drivers to control the sequence of operation of each of the plurality of stepper motor drivers;
   multiplexer means for selectively connecting certain stepper motors to certain stepper motor drivers for simultaneous operation of a separate stepper motor by each one of the plurality of stepper motor drivers, with at least one stepper motor driver connected by the multiplexer means to a plurality of stepper motors for mutually exclusive, sequential energization of each of the plurality of stepper motors connected to the at least one stepper motor driver; and
   control means, including a memory storing an executable control program, connected to the stepper motor controller and the multiplexor means, for activating the multiplexor means to connect certain predetermined stepper motor drivers to certain predetermined stepper motors.

2. The multiplexed stepper motor control apparatus of claim 1 wherein the multiplexor means comprises:
selectively energizable switch means, responsive to the control means, for electrically connecting one stepper motor driver to at least one stepper motor.

3. The multiplexed stepper motor control apparatus of claim 2 wherein:
the switch means is directly connected between each of the stepper motor drivers and certain predetermined stepper motors for mutually exclusively connecting the predetermined stepper motors to the each of the predetermined stepper motor drivers.

4. The multiplexed stepper motor control apparatus of claim 2 wherein the switch means comprises:
a plurality of separately energizable relays, each having a plurality of switchable contacts;
the relays connected to the control means for energization by control signals from the control means; and
the contacts of the relays connected between certain ones of the predetermined stepper motor drivers and certain predetermined stepper motors to electrically connect the certain predetermined stepper motor drivers to the certain predetermined stepper motors.

5. The multiplexed stepper motor control apparatus of claim 1 wherein the multiplexor means comprises:
a plurality of separately energizable switch means connected between one stepper motor driver and a plurality of stepper motors, one of the switch means being connected to each stepper motor; and
the switch means being mutually exclusively energized by the control means to sequentially and exclusively connect one of the plurality of stepper motors to one predetermined stepper motor driver.

6. The multiplexed stepper motor control apparatus of claim 2 further including:
separately energizable isolation means, connected between each stepper motor driver and each switch means of the multiplexor means, for electrically isolating each stepper motor driver from the multiplexor means and the stepper motors during activation of the switch means.

7. The multiplexed stepper motor control apparatus of claim 4 wherein:
the contact of each relay includes four contacts providing step and direction signals to the predetermined stepper motor.

8. The multiplexed stepper motor control apparatus of claim 1 wherein:
the control means, through the multiplexor, is operable to connect each of a plurality of stepper motor drivers to a different one of the predetermined stepper motors for simultaneous energization of all of the predetermined stepper motors.

9. The multiplexed stepper motor control apparatus of claim 2 wherein the switch means comprises:
first switch means including a plurality of switchable elements, each switchable between open and closed positions;
one of each of the switchable elements of the first switch means being connected between one of the plurality of stepper motor drivers and a plurality of different stepper motors;
the first switch means being switched by the control means to electrically connect the one stepper motor driver to all of the plurality of different stepper motors by the switchable elements of the first switch means such that the one stepper motor driver drives all of the stepper motors connected thereto concurrently; and
a plurality of second switch means, each including a plurality of switchable elements switchable between open and closed positions;
certain ones of the switchable elements of the second switch means being connected in parallel with a switchable element of the first switch means between a one of the stepper motor drivers and at least one of the stepper motors to connect the one stepper motor driver to the one stepper motor mutually exclusive of the connection of another stepper motor driver to the one stepper motor by the switchable element of the first switch means.

10. The multiplexed stepper motor control apparatus of claim 1 wherein the multiplexor means selectively connects each of the plurality of stepper motor drivers to each stepper motor, the control means selectively energizing the multiplexor means such that any one stepper motor driver is sequentially connected to a plurality of stepper motors and a plurality of stepper motor drivers are connected to different stepper motors for parallel energization of the different stepper motors.

11. The multiplexed stepper motor control apparatus of claim 10 wherein the multiplexor means comprises:
separately energizable switch means.

12. The multiplexed stepper motor control apparatus of claim 11 wherein the switch means comprises:
a plurality of separately energizable relays, each having a plurality of switchable contacts movable between open and closed positions;
the relays being responsive to signals from the control means for switching the associated contacts from open to closed positions; and
at least one contact of each relay electrically connected between each stepper motor driver and each stepper motor, the contacts of all of the relays connected to each stepper motor being connected in parallel to enable any one stepper motor driver to be electrically connected to any one of the plurality of stepper motors under the control of the control means;

13. The multiplexed stepper motor control apparatus of claim 12 wherein:
the control means, through the multiplexor means, is operable to connect each of the plurality of stepper motor drivers to a predetermined stepper motor for simultaneous energization of all of the predetermined stepper motors.

14. The multiplexed stepper motor control apparatus of claim 11 wherein:
the separately energizable switch means includes a plurality of first switchable elements, each switchable between open and closed positions;
one of each of the first switchable elements being connected between each stepper motor driver and each stepper motor;
one of each of the first switchable elements being connected between each of the plurality of stepper motor drivers and one of the stepper motors to enable any one of the stepper motor drivers to energize the one stepper motor when the first switchable elements are energized;

a plurality of second switchable elements, each switchable between open and closed positions;

one of each of the second switchable elements being connected between each of the plurality of stepper motor drivers and a second one of the stepper motors for connecting any one of the stepper motor drivers to the second stepper motor.

15. A multiplexed stepper motor control apparatus comprising:

a plurality of stepper motors;

a plurality of selectively energizable stepper motor drivers, the stepper motor drivers supplying electrical energy to certain stepper motors;

a stepper motor controller means for supplying control signals to the stepper motor drivers controlling the sequence of operation of certain of the plurality of stepper motor drivers;

multiplexor means for selectively connecting certain stepper motors to certain stepper motor drivers with at least one stepper motor driver connected by the multiplexor means to a plurality of stepper motors for exclusive energization of each of the plurality of stepper motors one at a time by the one stepper motor driver, the multiplexor means including selectively energizable switch means electrically connected between certain predetermined stepper motor drivers and certain predetermined stepper motors, for electrically connecting the certain predetermined stepper motor drivers to the certain predetermined stepper motors when each switch means is activated;

control means, including a memory storing an executable control program, and connected to the stepper motor driver controller and the multiplexor means, for activating the multiplexor means to connect certain predetermined stepper motor drivers to certain predetermined stepper motors; and separately energizable isolation means, connected between each stepper motor driver and each switch means and switchable between open and closed states to isolate each stepper motor driver from the switch means while the switch means are being activated.

16. The multiplexed stepper motor control apparatus of claim 1 further comprising:

an object coupled to and bi-directionally driven by each stepper motor;

a clockwise over-travel detection means mounted in a travel path of the object for detecting a maximum clockwise rotation of the stepper motor corresponding to a maximum travel position of the object in one direction;

counterclockwise over-travel detection means, mounted in a travel path of the object, for detecting a maximum counterclockwise rotation of the stepper motor corresponding to a maximum over-travel position of the object in an opposite direction;

home position detection means, mounted in a travel path of the object, for detecting a home position of the object; and travel position select switch means, associated with each stepper motor and responsive to the control means and connected in series with the clockwise over-travel detection means, the counterclockwise over-travel detection means and the home position detection means, for generating signals supplied to the control means when the object driven by a selected stepper motor reaches one of the maximum travel positions and the home position.

17. The multiplexed stepper motor control apparatus of claim 16 wherein the cockwise over-travel detection means, the counterclockwise over-travel detection means and the home position detection means comprise limit switches.

18. The multiplexed stepper motor control apparatus of claim 16 wherein the travel position select switch means comprises:

a plurality of separately energizable relays, each having a plurality of switchable contacts;

each of the relays being selectively engaged by the control means when one of the stepper motor drivers is connected by the multiplexor means to one of the stepper motors; and the contacts of the relays connected in series with the clockwise over-travel detection means, the counterclockwise over-travel detection means and the home position detection means.

* * * * *